(12) United States Patent
Kimura et al.

(10) Patent No.: US 11,470,145 B2
(45) Date of Patent: Oct. 11, 2022

(54) SERVER SELECTION APPARATUS, SERVER SELECTION METHOD AND PROGRAM

(71) Applicant: Nippon Telegraph and Telephone Corporation, Tokyo (JP)

(72) Inventors: Takuto Kimura, Tokyo (JP); Arifumi Matsumoto, Tokyo (JP); Hideaki Kinsho, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/413,837

(22) PCT Filed: Dec. 5, 2019

(86) PCT No.: PCT/JP2019/047669
§ 371 (c)(1),
(2) Date: Jun. 14, 2021

(87) PCT Pub. No.: WO2020/129680
PCT Pub. Date: Jun. 25, 2020

(65) Prior Publication Data
US 2022/0060538 A1 Feb. 24, 2022

(30) Foreign Application Priority Data
Dec. 19, 2018 (JP) .............................. JP2018-237466

(51) Int. Cl.
*G06F 15/16* (2006.01)
*H04L 67/1001* (2022.01)

(52) U.S. Cl.
CPC ................ *H04L 67/1001* (2022.05)

(58) Field of Classification Search
CPC ......................... H04L 67/1002; G06F 15/173
See application file for complete search history.

(56) References Cited

U.S. PATENT DOCUMENTS

| | | | |
|---|---|---|---|
| 6,850,984 B1 * | 2/2005 | Kalkunte | H04L 67/322 709/227 |
| 8,122,098 B1 * | 2/2012 | Richardson | H04L 61/2007 709/217 |

(Continued)

FOREIGN PATENT DOCUMENTS

| | | |
|---|---|---|
| JP | 2005-352762 | 12/2005 |
| JP | 2014-29694 | 2/2014 |

OTHER PUBLICATIONS

Cedexis.com, [online], "Openmix Always Knows the Ideal Delivery Option," 2018, retrieved on Dec. 18, 2018, retrieved from URL<https://www.cedexis.com/openmix/>, 8 pages.

(Continued)

*Primary Examiner* — Razu A Miah
(74) *Attorney, Agent, or Firm* — Fish & Richardson P.C.

(57) ABSTRACT

A server selection devices includes: an acquisition unit for acquiring, regarding each of a plurality of servers having the same content, a list of quality information corresponding to communication environment information regarding a source of request for download of the content; and a selection unit for selecting one of the plurality of servers based on the list of the quality information regarding each of the plurality of servers and a cost associated with download of the content. Thus, a destination of a content download request can be selected while giving consideration to not only quality but also cost.

6 Claims, 8 Drawing Sheets

(56) References Cited

U.S. PATENT DOCUMENTS

| | | | | |
|---|---|---|---|---|
| 2004/0148393 | A1* | 7/2004 | Breiter | H04L 67/1008 709/225 |
| 2006/0271700 | A1* | 11/2006 | Kawai | H04L 67/1002 709/233 |
| 2009/0144285 | A1* | 6/2009 | Chatley | G06F 3/0613 |
| 2009/0144412 | A1* | 6/2009 | Ferguson | H04L 67/14 709/224 |
| 2010/0306373 | A1* | 12/2010 | Wormley | H04L 67/1002 709/224 |
| 2010/0332615 | A1* | 12/2010 | Short | H04L 12/14 709/217 |
| 2011/0282968 | A1* | 11/2011 | Oliver | G06F 9/5072 709/217 |
| 2012/0072604 | A1* | 3/2012 | Stephan | H04L 67/104 709/228 |
| 2012/0131178 | A1* | 5/2012 | Zhu | H04L 67/1004 709/224 |
| 2014/0250230 | A1* | 9/2014 | Brueck | H04L 67/18 709/226 |

OTHER PUBLICATIONS

Liu et al., "A Case for a Coordinated Internet Video Control Plane," Proceedings of the ACM Sigcomm 2012 Conference on Applications, Technologies, Architectures, and Protocols for Computer Communication, Sigcomm 2012, Aug. 13, 2012, pp. 359-370.

Wamser et al., "Server and Content Selection for MPEG Dash Video Streaming with Client Information," Proceedings of the Workshop on QoE-based Analysis and Management of Data Communication Networks, Internet QoE 2017, Aug. 21, 2017, pp. 19-24.

* cited by examiner

| CONTENT INFORMATION | SERVER INFORMATION |
|---|---|
| http://www.aaa.com/01.ts | Server A |
| http://www.aaa.com/01.ts | Server B |
| http://www.aaa.com/01.ts | Server C |
| http://www.aaa.com/02.ts | Server A |
| http://www.aaa.com/02.ts | Server B |
| : | : |

Fig. 6

| TIME PERIOD | CARRIER NAME | CELL ID | SERVER INFORMATION | THROUGHPUT |
|---|---|---|---|---|
| 10 | Carrier A | aaaaaa | Server A | 1000 |
| 10 | Carrier A | aaaaaa | Server A | 2000 |
| 10 | Carrier A | aaaaaa | Server A | 500 |
| 11 | Carrier A | aaaaaa | Server A | 900 |
| 11 | Carrier A | aaaaaa | Server A | 1100 |
| 11 | Carrier A | aaaaaa | Server B | 2000 |
| 11 | Carrier A | bbbbbb | Server A | 500 |
| 11 | Carrier A | bbbbbb | Server A | 1000 |
| 11 | Carrier A | bbbbbb | Server A | 2000 |
| 11 | Carrier B | 111111 | Server B | 2000 |
| : | : | : | : | : |

Fig. 7

| SERVER INFORMATION | COST (YEN/Gbyte) |
|---|---|
| Server A | 0.001 |
| Server B | 0.005 |
| Server C | 0.002 |

Fig. 8

| TIME PERIOD | CARRIER NAME | CELL ID | SERVER INFORMATION | $\mu$ | $\sigma$ |
|---|---|---|---|---|---|
| 10 | Carrier A | aaaaaa | Server A | 1000 | 100 |
| 11 | Carrier A | aaaaaa | Server A | 900 | 80 |
| 11 | Carrier A | aaaaaa | Server B | 2000 | 200 |
| 11 | Carrier A | bbbbbb | Server A | 500 | 10 |
| 11 | Carrier B | 111111 | Server B | 2000 | 100 |
| : | : | : | : | : | : |

112

SERVER SELECTION APPARATUS, SERVER SELECTION METHOD AND PROGRAM

CROSS-REFERENCE TO RELATED APPLICATIONS

This application is a National Stage application under 35 U.S.C. § 371 of International Application No. PCT/JP2019/047669, having an International Filing Date of Dec. 5, 2019, which claims priority to Japanese Application Serial No. 2018-237466, filed on Dec. 19, 2018. The disclosure of the prior application is considered part of the disclosure of this application, and is incorporated in its entirety into this application.

TECHNICAL FIELD

The present invention relates to a server selection device, a server selection method, and a program.

BACKGROUND ART

A user who browses the Web or browses videos, for example, via the Internet downloads content from a server installed by a content provider or a CDN (Content Delivery Network) to a terminal. At this time, if congestion occurs due to intensive access to the server or a security attack, the response speed of the server may be slowed down or the server may stop responding altogether. Such deterioration in quality of service can significantly affect user's experimental quality.

For this reason, multi-server environments have been introduced where content is located on a plurality of servers such that when the communication quality of one server is deteriorating, the content can be downloaded from another server. A "server" here refers to an on-premises server, a CDN itself, or a combination thereof.

Multi-server selection solutions have already been commercialized by Conviva and Cedexis. The solution provided by Conviva realizes content delivery with higher communication quality by downloading content from the CDN with the highest throughput based on the quality information regarding each CDN provided real time (NPL 1). Opening provided by Cedex allows a user to freely assemble a CDN selection algorithm by combining indexes such as throughput and RTT (round trip time) and writing a selection logic as a program (NFL 2). Furthermore, a method of probabilistically selecting a CDN based on the ratio of the most recent throughput has also been proposed (NFL 3).

CITATION LIST

Non Patent Literature

[NPL 1] [online], Internet <URL: https://www.cedexis.com/openmix/>

[NPL 2] Liu, Xi and Dobrian, Florin and Milner, Henry and Jiang, Junchen and Sekar, Vyas and St Sloan Ion and Zhang, Hui, A Case for a Coordinated. Internet Video Control Plane, Proceedings of the ACM SIGCOMM 2012 Conference on Applications, Technologies, Architectures, and Protocols for Computer Communication, SIGCOMM 2012

[NPL 3] Wamser, Florian and Hofner, Steffen and Seufert, Michael and Tran-Gia, Phuoc, Server and Content Selection for MPEG DASH Video Streaming with Client Information, Proceedings of the Workshop on 00E-based Analysis and Management of Data Communication Networks, Internet QoE 2017

SUMMARY OF THE INVENTION

Technical Problem

As described above, selection algorithms and the environment in which selection can be made in a multi-server environment are being developed. However, the existing selection algorithms select servers based solely on quality and do not focus on the cost.

For example, a situation will be considered where there are two servers A and B, and one of these servers is selected as a destination of a content download request. Here, it is assumed that the server A is of high quality and high cost, while the server B is of moderate quality but low cost. In this case, if an appropriate server is to be selected while giving consideration solely to quality, the server A is the best choice. However, if only moderate quality is required by an application, selecting the server B can reduce the cost while still meeting the required quality.

The present invention has been made in view of the foregoing, and an object of the invention is to enable selection of a content server while giving consideration to not only quality but also cost.

Means for Solving the Problem

To solve the above-described problem, a server selection device includes: an acquisition unit for acquiring, regarding each of a plurality of servers having the same content, a list of quality information corresponding to communication environment information regarding a source of a request for download of the content; and a selection unit for selecting one of the plurality of servers based on the list of the quality information regarding each of the plurality of servers and a cost associated with download of the content.

Effects of the Invention

A content server can be selected while giving consideration to not only quality but also cost.

DESCRIPTION OF EMBODIMENTS

Figure 1:
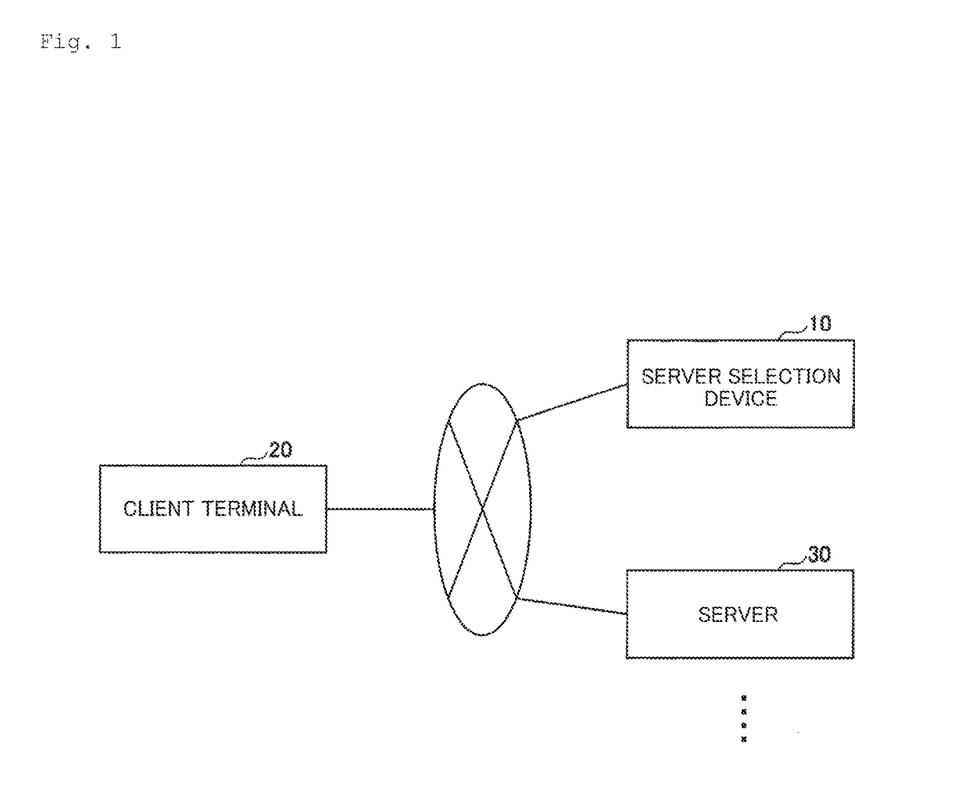
FIG. 1 is a diagram showing an example system configuration according to a first embodiment.

Hereinafter, embodiments of the present invention will be described with reference to the drawings. FIG. 1 is a diagram showing an example system configuration according to the first embodiment. In FIG. 1, one or more client terminals 20 are connected to a server selection device 10 and a plurality of servers 30 via the Internet or a network such as a LAN (Local Area Network).

Each of the client terminal 20 is a terminal used by a user to download and browse content such as Web pages and videos. That is to say, the client terminal 20 is a source of a content download request. For example, a smartphone, a table terminal, a mobile phone, a PC (Personal Computer), or the like may be used as the client terminal 20.

The servers 30 are one or more computers or CDNs (Content Delivery Networks) that have the same content that is to be downloaded by the client terminal 20, and are candidate destinations of a request for download of this content. That is to say, in the present embodiment, a multi-server environment is constructed in which the same content is located on a plurality of servers 30, and the plurality of servers 30 are candidate destinations of a request for download of this, content. Each of the servers 30 is identified by server information. The server information is ID (identification information) that contains sufficient information necessary to specify the location of the content, such as a destination IP address, a destination URL, a CDN type, and a server name.

The server selection device 10 is constituted by one or more computers for selecting one server 30 from a plurality of candidates (servers 30) with respect to the content to be downloaded.

Figure 2:
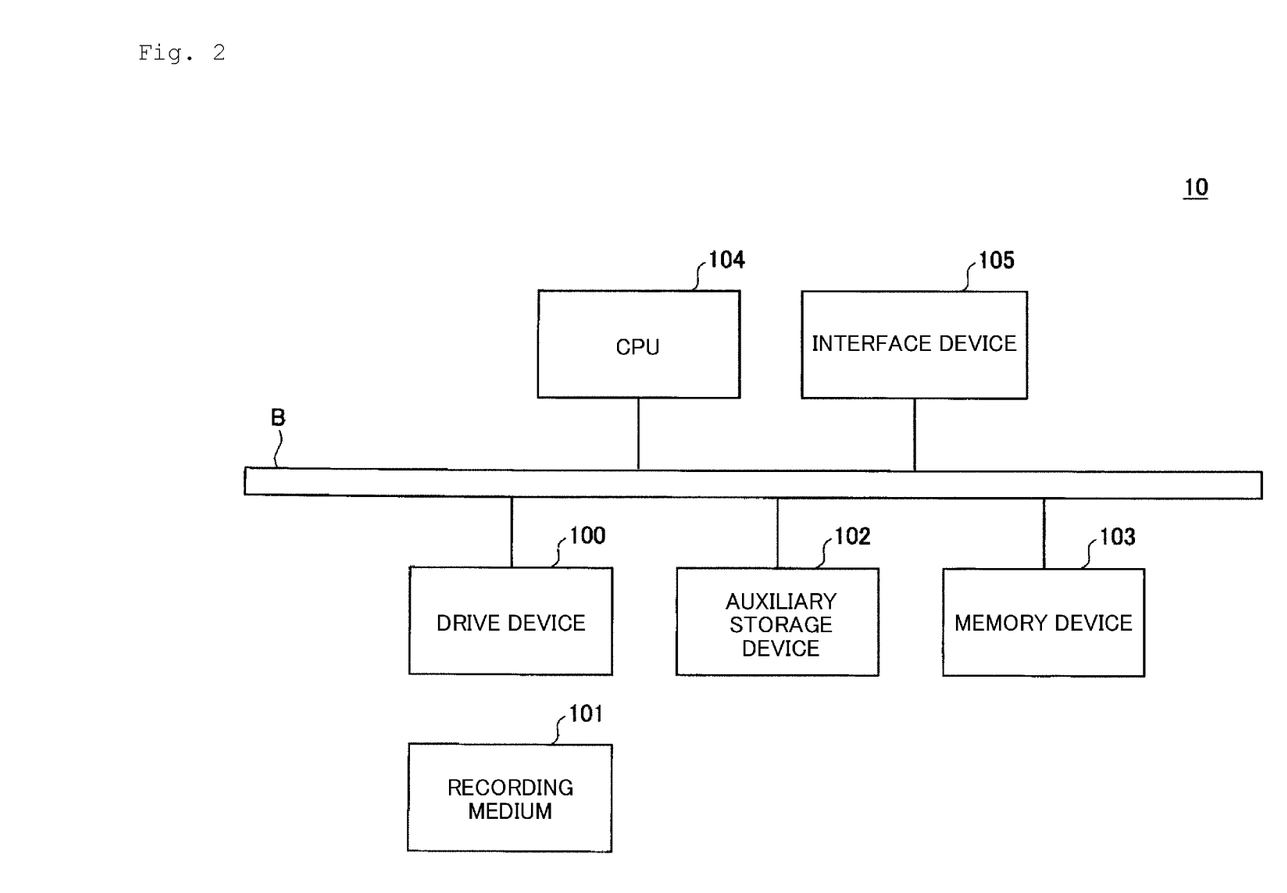
FIG. 2 is a diagram showing an example hardware configuration of a server selection device 10 according to the first embodiment.

FIG. 2 is a diagram showing an example hardware configuration of the server selection device 10 according to the first embodiment. The server selection device 10 in FIG. 2 has a drive device 100, an auxiliary storage device 102, a memory device 103, a CPU 104, an interface device 105, and so on, which are connected to each other by a bus B.

A program that realizes processing performed in the server selection device 10 is provided by a recording medium 101, which is a CD-ROM or the like. Upon the recording medium 101 in which the program is stored being set to the drive device 100, the program is installed in the auxiliary storage device 102 from the recording medium 101 via the drive device 100. However, the program need not necessarily be installed from the recording medium 101, and may alternatively be downloaded from another computer via a network. The auxiliary storage device 102 stores the installed program, and also stores necessary files, data, or the like.

If an instruction to start the program is given, the memory device 103 loads the program from the auxiliary storage device 102 and stores the loaded program. The CPU 104 performs functions of the server selection device 10 in accordance with the program stored in the memory device 103. The interface device 105 is used as an interface for connecting to the network.

Figure 3:
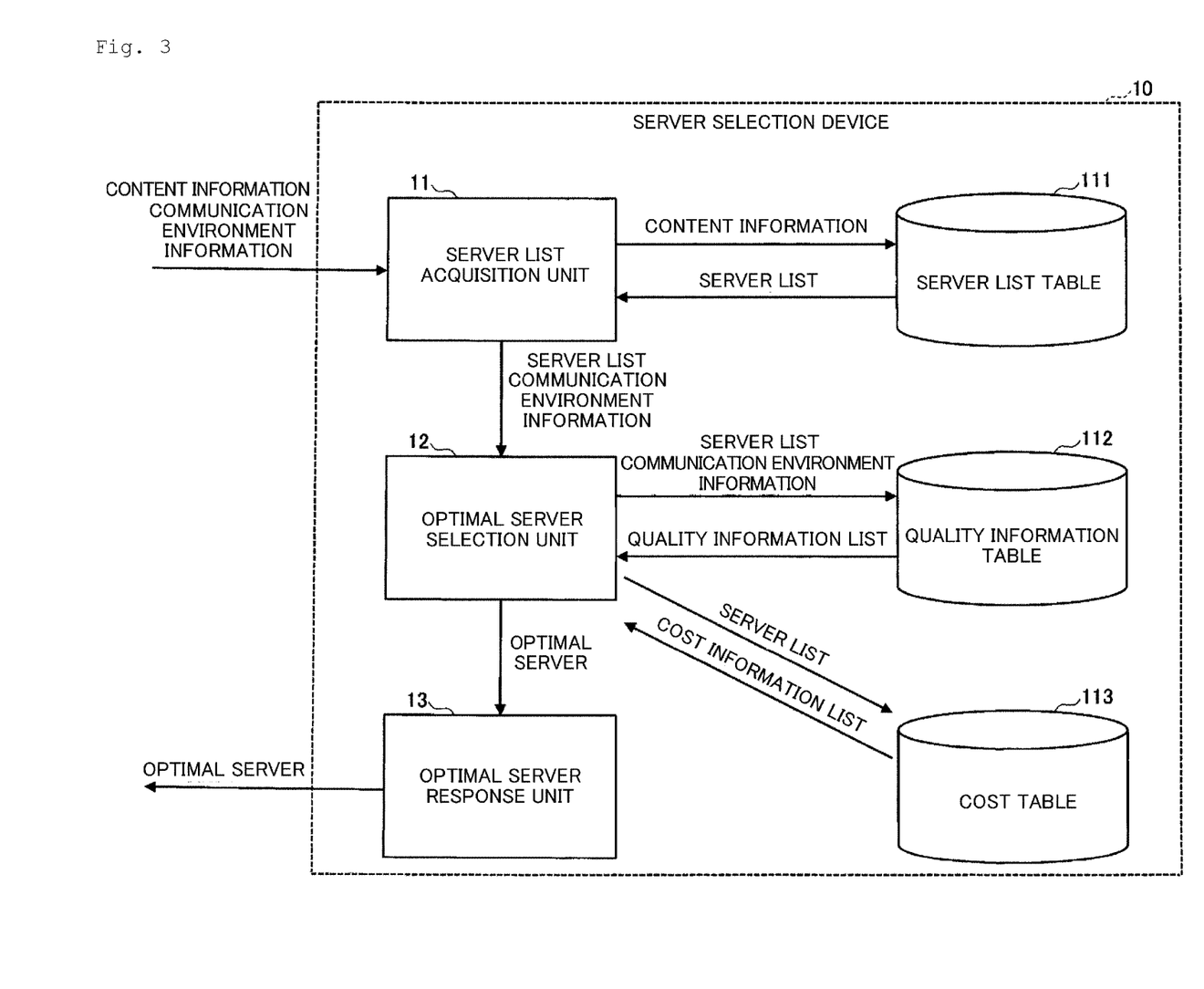
FIG. 3 is a diagram showing an example functional configuration of the server selection device 10 according to the first embodiment.

FIG. 3 is a diagram showing an example functional configuration of the server selection device 10 according to the first embodiment. In FIG. 3, the server selection device 10 has a server list acquisition unit 11, an optimal server selection unit 12, and an optimal server response unit 13. These units are realized by processing that one or more programs installed in the server selection device 10 cause the CPU 104 to perform. The server selection device 10 also uses tables (storage unit) such as a server list table 111, a quality information table 112, and a cost table 113. These tables can be realized by using, for example, the auxiliary storage device 102, or a storage device that can be connected to the server selection device 10 via a network.

With the functional configuration shown in FIG. 3, the server selection device 10 receives input of communication environment information regarding the client terminal 20 used by a user to browse content, for example, and content information regarding the content to be browsed, selects a server 30 that is optimal as a destination of a content download request, and outputs the selection result.

The communication environment information refers to information that indicates a communication environment to which the client terminal 20 pertains, or information that affects the communication environment. For example, the communication environment information is expressed by a combination of all or some of a time period, an IP address, an ISP, a carrier name, a base stat on ID, a cell ID, and GPS information.

The content information is information for specifying content, and is expressed in the form of a URI (Uniform Resource Identifier) or the like, for example.

Figure 4:
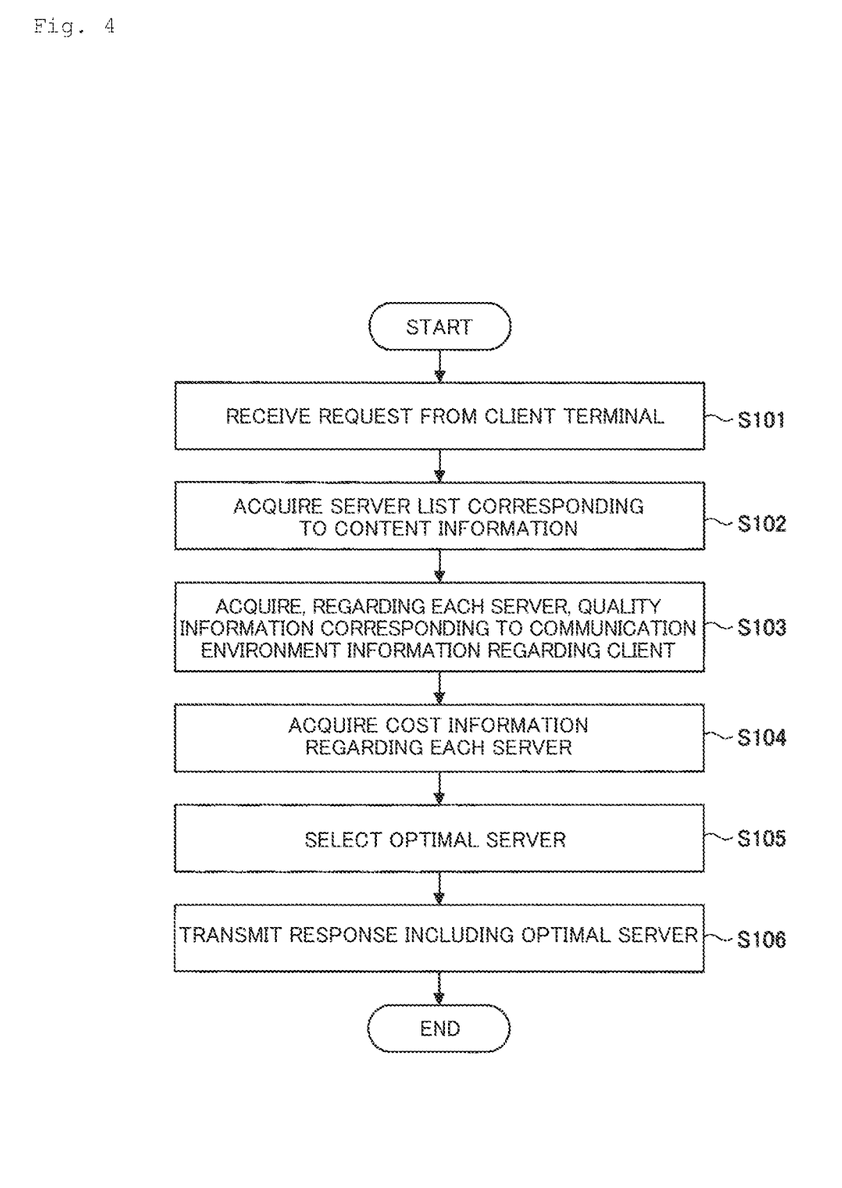
FIG. 4 is a flowchart for illustrating an example of a processing procedure performed by the server selection device 10 of the first embodiment.

A processing procedure performed by the server selection device 10 will be described below. FIG. 4 is a flowchart for illustrating an example of the processing procedure performed by the server selection device 10 of the first embodiment.

In step S101, the server list acquisition unit 11 receives a request regarding selection of a server that is to be a destination of a content download request transmitted from the client terminal 20. For example, the client terminal transmits the request to the server selection device 10 when content needs to be downloaded, e.g. when an instruction to download the content is input by the user. This request includes content information regarding the content to be downloaded, communication environment information regarding the client terminal that is the transmission source of the request, and so on.

Subsequently, the server list acquisition unit 11 acquires a list of server information (hereinafter referred to as a "server list") regarding the servers 30 that holds the content identified by the content information included in the received request (hereinafter referred to as a "target request") (S102). The server list may be acquired by referencing the server list table 111.

Figure 5:
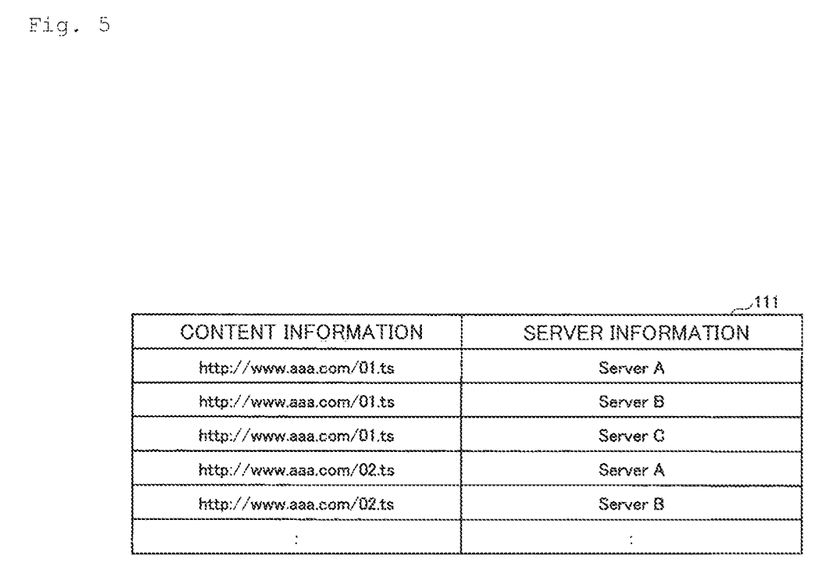
FIG. 5 is a diagram showing an example configuration of a server list table 111.

FIG. 5 is a diagram showing an example configuration of the server list table 111. As shown in FIG. 5, the server list table 111 stores server information regarding the servers 30 that holds content associated with content information, in association with the content information in. FIG. 5 shows an example in which URIs and server names are used as the content information and the server information, respectively.

According to FIG. 5, if, for example, "http://www.aaa-.com/01.ts" is input as the content information, {ServerA, ServerB, ServerC} is obtained as a server list.

Note that the server list may be included in the request from the client terminal 20. For example, a server list may be designated by the user of the client terminal 20. In this case, the server list table 111 need not be referenced.

Subsequently, the optimal server selection unit 12 acquires, from the quality information table 112, quality information corresponding to the communication environment information input by the user, regarding the server information included in the server list (S103).

Figure 6:
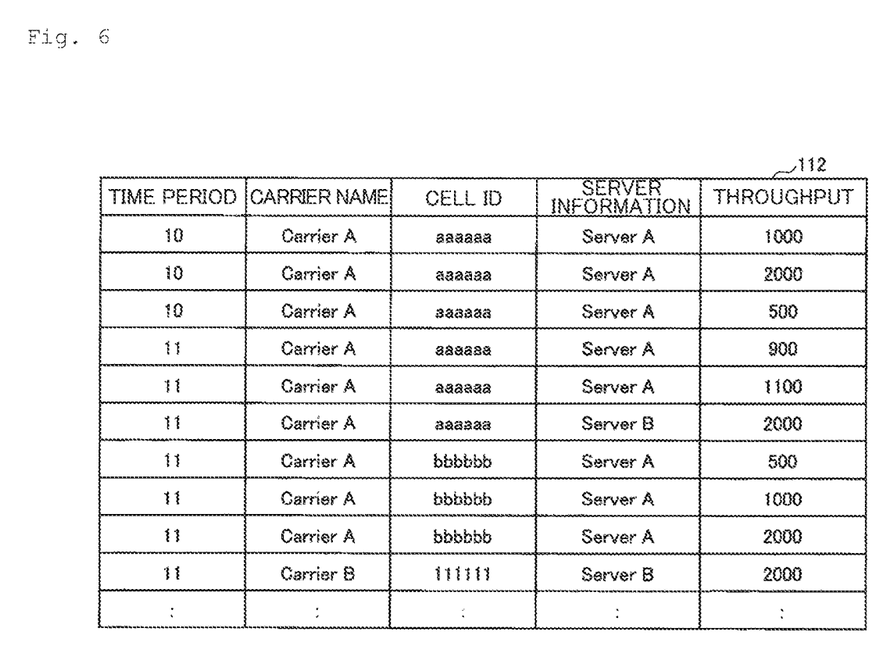
FIG. 6 is a diagram showing an example configuration of a quality information table 112.

FIG. 6 is a diagram showing an example configuration of the quality information table 112. As shown in FIG. 6, the quality information table 112 stores a history including communication environment information, server information, and quality information for each content download that has been done in the past. The communication environment information is communication environment information regarding the client terminals 20 that were download request sources. The server information is server information regarding the servers 30 that were download request destinations. The quality information is Quality information regarding the downloads. In the example in FIG. 6, a set of a time period, a carrier name, and a cell ID is used as the communication environment information, a server name is used as the server information, and a throughput is used as the quality information.

According to the example in FIG. 6, for example, if the communication environment information included in a request is "time period=10, carrier name=CarrierA, cell ID=aaaaaa", {1000, 2000, 500, 900, 1100} is acquired as a list of throughputs (hereinafter referred to as a "quality information list") regarding Server A. That is to say, a record corresponding to the communication environment information is acquired, and the Quality information regarding the acquired record is listed and acquired as the quality information list for each item of server information.

Although FIG. 6 shows an example in which a throughput is used as the quality information, any other index that can be acquired from a client terminal 20, a terminal dedicated to measurement, or a server 30 may alternatively be used as the quality information. For example, an inverse of an RTT, an inverse of a jitter, an inverse of a wait time for display of a Web page, an average bit rate of an image, an inverse of a reproduction stop time of an image, an inverse of a bit rate variation of an image, an estimated experiential quality value, or a weighted sum of these values may be used as the quality information. That is to say, in the present embodiment, the quality information is an index that indicates higher quality the larger the value is.

Subsequently, the optimal server selection unit 12 acquires a cost corresponding to the server information included in the server list from the cost table 113 (S104).

Figure 7:
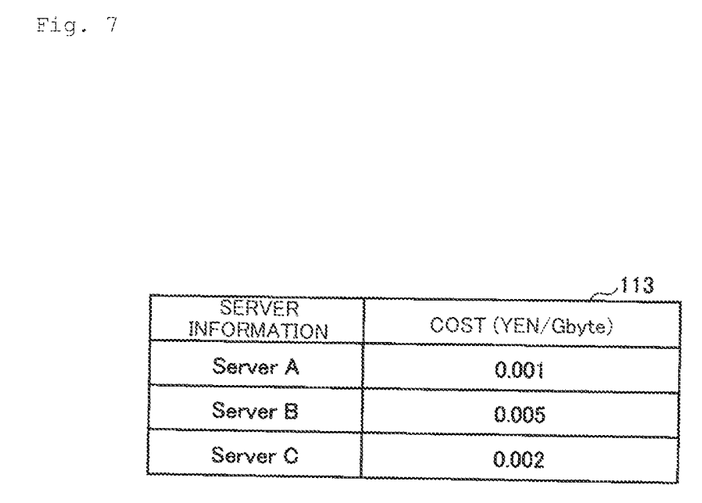
FIG. 7 is a diagram showing an example configuration of a cost table 113.

FIG. 7 is a diagram showing an example configuration of the cost table 113. As shown in FIG. 7, the cost table 113 stores costs for each item of the server information in association with each other. The cost refers to a monetary cost per unit of traffic required to acquire (download) content from a server 30, and is, for example, a cost required per unit of traffic, such as a usage fee based on the amount of data transferred by a CDN and a transit fee.

Subsequently, the optimal server selection unit 12 selects one server 30 (hereinafter referred to as an "optimal server 30") from a group of the servers 30 whose server information is included in the server list, based on the quality information list and the cost of the servers 30 whose server information is included in the server list (S105). Here, the quality information list of ith server information i in the server list is denoted as $q_i=\{q_{1i}, q_{2i}, \ldots q_{ni}\}$. That is to say, $q_{ni}$ denotes nth quality information in the quality information list for the server information i. Also, the cost for the server information i is denoted as $c_i$.

In the first embodiment, the optimal server selection unit 12 obtains $S=\{i|f(q_i) \geq T\}$ based on an aggregate function f $(q_i)$ of the quality information and a threshold T that are given in advance, and selects a servo $i^*=\text{argmin}_{i \in S} c_i$ as the optimal server 30. That is to say, the optimal server selection unit 12 selects a server 30 with the smallest cost as the optimal server 30 from some servers 30 extracted based on a comparison between the output of the aggregate function $f(q_i)$ and the threshold. T (servers 30 with which the output is greater than or equal to the threshold T). Note that, in the present embodiment, a greater value of the quality information indicates higher quality. Accordingly, the quality information greater than or equal to the threshold T corresponds to quality information indicating that the quality is higher than the threshold T.

The aggregation function $f(q_i)$ may be a function that outputs any percentile value with $q_i$, a mean value of $q_i$, a mode of $q_i$, a weighted mean of the average and standard deviation of a ratio of quality information above a predesignated threshold among elements of $q_i$, or the like.

The output of the aggregate function $f(q_i)$ is, for example, any percentile value with $q_i$ a mean value of $q_i$, a mode with $q_i$ a weighted mean of the mean and standard deviation of $q_i$, a ratio of quality information above a predesignated threshold among the elements of $q_i$, or the like. The output of the aggregate function $f(q_i)$ may be obtained based on an empirical distribution of a set of quality information included in $q_i$, or may be obtained based on any kind of distribution function by fitting the empirical distribution (the set) to this distribution function. In the latter case, the result of fitting to the distribution function may be used. In the latter case, a distribution function of any distribution that includes a parameter, such as a normal distribution, a lognormal distribution, or a beta distribution, may be used.

For example, it is assumed that the content of the server list is {ServerA, ServerB, ServerC}, $q_1$={1000, 2000, 3000}, $q_2$={100, 200, 300}, $q_3$={10000, 20000, 30000}, $c_1$=0.1, $c_2$=0.1, $c_3$=1.0, 1=1000, and $f(q_i)=(1/(|q_i|))\Sigma_j q_{ji}$. In this case, $f(q_1)$=2000, $f(q_2)$=200, and $f(q_3)$=20000. Thus, if only the quality information is considered, Server C is selected as the optimal server 30. In contrast, according to the first embodiment, S={ServerA, ServerC}, and $\text{argmin}_{i \in S} c_i$=1. Thus, Server A is selected.

Subsequently, the optimal server response unit 13 transmits a response including the server information regarding the optimal server 30 to the client terminal 20 that is the request transmission source (S106). The client terminal 20 that has received the server information downloads the content from the server 30 associated with the server information.

As described above, according to the first embodiment, a content server 30 can be selected for content while giving consideration to not only quality but also cost. Accordingly, the cost can be reduced while maintaining user's experimental quality, and more economical video distribution and Web browsing can be realized than in the case of applying a conventional method for selecting a server 30.

Note that the quality information table 112 may store a value of the aggregate function $f(q_i)$, a parameter of a distribution function used for fitting, and so on for each combination of the communication environment information and the server information, rather than directly storing the quality information for each content download.

Figure 8:
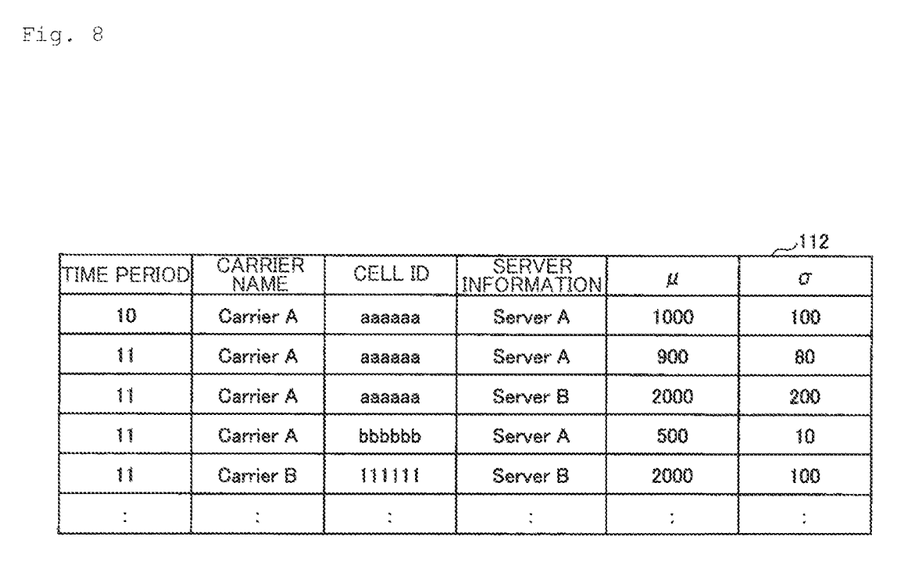
FIG. 8 is a diagram showing an example in which parameters of a fitting distribution are stored in the quality information table 112.

FIG. 8 is a diagram showing an example in which parameters of a fitting distribution are stored in the quality information table 112. Here, an example is shown in which a lognormal distribution is used as the fitting distribution, and μ and σ, which are parameters thereof, are stored. The value of the aggregate function $f(q_i)$ for each combination of the communication environment information and the server information, or fitting to the distribution function may be carried out every every prespecified time period, or may be carried out every time the quality information arrives.

Next, a second embodiment will be described. The second embodiment will describe differences from the first embodiment. The points not particularly mentioned in the second embodiment may be the same as those in the first embodiment.

In the second embodiment, the method for selecting the optimal server 30 in step S105 in FIG. 4 differs from that of the first embodiment. Specifically, a parameter $\alpha$ ($\alpha \geq 0$) for adjusting the balance between the quality information and the cost is introduced for the aggregation function $f(q_i)$ of the quality information. In this case, the optimal server selection unit 12 selects a server $i^* = \text{argmax}_i(f(q_i) - \alpha c_i)$ as the optimal server 30 at a given time. That is to say, a server 30 with which the sum of the output of the aggregation function $f(g_i)$ and the cost weighted by $\alpha$ (in this example, the sum of the output of the aggregation function $f(q_i)$ and a negative weighted cost because the weighting coefficient is negative) is the largest is selected as the optimal server 30.

For example, it is assumed that the content of the server list is {ServerA, ServerB, ServerC}, $q_1$={1000, 2000, 3000}, $q_2$={100, 200, 300}, $q_3$={10000, 20000, 30000}, $c_1$=0.1, $c_2$=0.1, $c_3$=1.0, $\alpha$=100000, and $f(q_i) = (1/(|q_i|))\Sigma_j q_{ji}$. In this case, $f(q_1) - \alpha c_1 = -8000$, $f(q_2) - \alpha c_2 = -9800$, and $f(q_3) - \alpha c_3 = -80000$. Thus, if only the quality information is considered, Server C is selected as the optimal server 30. In contrast, according to the second embodiment, $\text{argmax}_i f(q_i) - \alpha c_i = 1$. Thus, Server A is selected.

Note that in the above embodiments, the server list acquisition unit 11 is an example of an acquisition unit. The optimal server selection unit 12 is an example of a selection unit.

Although the embodiments of the present invention have been described in detail, the present invention is not limited to those specific embodiments, and various modifications and changes may be made within the scope of the gist of the present invention described in the claims.

REFERENCE SIGNS LIST

10 Server selection device
11 Server list acquisition unit
12 Optimal server selection unit
13 Optimal server response unit
20 Client terminal
30 Server
100 Drive device
101 Recording medium
102 Auxiliary storage device
103 Memory device
104 CPU
105 Interface device
111 Server list table
112 Quality information table
113 Cost table
B Bus

The invention claimed is:

1. A server selection device comprising:
an acquisition unit, including at least one processor, configured to acquire, for each of a plurality of servers having a same content, a list of quality information corresponding to communication environment information regarding a source of a request for download of the content; and
a selection unit, including at least one processor, configured to select one of the plurality of servers based on an output of an aggregate function calculated from multiple quality elements in the list of the quality information regarding each of the plurality of servers and a cost associated with download of the content, wherein the list of the quality information regarding each of the plurality of servers comprises a plurality of quantitative values each representing a quality of the corresponding server of the plurality of servers, and wherein the output of the aggregate function includes a ratio of quality information above a pre-designated threshold among the quality elements.

2. The server selection device according to claim 1, wherein the selection unit (1) selects one or more servers from the plurality of servers based on that the output of the aggregate function of the one or more servers is greater than a threshold, and (2) select the one of the plurality of servers among the one or more selected servers based on the cost being the smallest among costs of the one or more servers.

3. The server selection device according to claim 2, wherein the selection unit selects a server from which a sum of: (1) the output of the aggregate function; and (2) the cost that is weighted by multiplying a weighting coefficient is the largest among the plurality of servers.

4. The server selection device according to claim 2, wherein the output of the aggregate function is an output based on an empirical distribution of the quality information, or an output based on a result of fitting the quality information to a distribution function.

5. A server selection method for a computer comprising:
acquiring, regarding each of a plurality of servers having a same content, a list of quality information corresponding to communication environment information regarding a source of a request for download of the content; and
selecting one of the plurality of servers based on an output of an aggregate function calculated from multiple quality elements in the list of the quality information regarding each of the plurality of servers and a cost associated with download of the content, wherein the list of the quality information regarding each of the plurality of servers comprises a plurality of quantitative values each representing a quality of the corresponding server of the plurality of servers, and wherein the output of the aggregate function includes a ratio of quality information above a pre-designated threshold among the quality elements.

6. A non-transitory computer readable medium comprising a program for causing a computer to function as a server selection device by performing operations comprising:
acquiring, by an acquisition unit, for each of a plurality of servers having a same content, a list of quality information corresponding to communication environment information regarding a source of a request for download of the content; and
selecting, by a selection unit, one of the plurality of servers based on an output of an aggregate function calculated from multiple quality elements in the list of the quality information regarding each of the plurality of servers and a cost associated with download of the content, wherein the list of the quality information regarding each of the plurality of servers comprises a plurality of quantitative values each representing a quality of the corresponding server of the plurality of servers, and wherein the output of the aggregate function includes a ratio of quality information above a pre-designated threshold among the quality elements.

* * * * *